United States Patent [19]

Doi et al.

[11] Patent Number: 5,462,988
[45] Date of Patent: Oct. 31, 1995

[54] SILICONE COPOLYMER EMULSION

[75] Inventors: Yukio Doi, Ibo; Wei-Zhong Zhang, Tatuno; Koichi Ishitani, Tatuno; Masayoshi Kinugasa, Tatuno, all of Japan

[73] Assignee: Showa Highpolymer Co., Ltd., Tokyo, Japan

[21] Appl. No.: 227,339

[22] Filed: Apr. 14, 1994

[30] Foreign Application Priority Data

Apr. 16, 1993 [JP] Japan .................................. 5-114139

[51] Int. Cl.$^6$ ............................. C08J 3/02; C08L 43/04
[52] U.S. Cl. ......................... 524/501; 524/806; 524/837; 526/278; 528/15; 528/17; 528/31; 528/32; 528/33
[58] Field of Search ......................... 524/501, 806, 524/837; 526/278; 528/15, 17, 31, 32, 33

[56] References Cited

U.S. PATENT DOCUMENTS

| | | | |
|---|---|---|---|
| 4,426,490 | 1/1984 | Dallavia, Jr. et al. | 524/837 |
| 4,908,274 | 3/1990 | Jachmann et al. | 528/32 |
| 5,064,694 | 11/1991 | Gee | 524/837 |
| 5,302,658 | 4/1994 | Gee et al. | 524/837 |
| 5,352,724 | 10/1994 | Fujiki et al. | 524/837 |

FOREIGN PATENT DOCUMENTS 0565093 10/1993 European Pat. Off. .
4-036353 2/1992 Japan ..................................... 526/279
WO94/06838 3/1994 WIPO .

*Primary Examiner*—Mark Sweet
*Attorney, Agent, or Firm*—Oblon, Spivak, McClelland, Maier & Neustadt

[57] ABSTRACT

A silicone copolymer emulsion comprising:
(A) 10 to 90 wt % of a silicone component containing
    (i) 5 to 60 wt % of compound (a) and
    (ii) 95 to 40 wt % of a crosslinkable silicone;
(B) 90 to 10 wt % of a copolymerizable monomer; and
(C) a curing catalyst,
said compound (a) being expressed by the following formula (1):

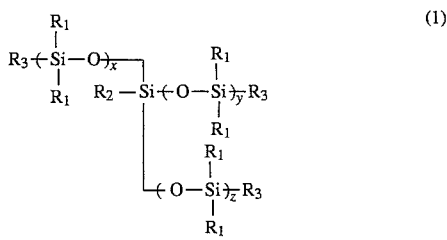

wherein $R_1$, $R_2$ and $R_3$ denote alkyl, phenyl, (meth)acryloxyalkyl and the like.

4 Claims, No Drawings

SILICONE COPOLYMER EMULSION

BACKGROUND OF THE INVENTION

1. Field of the Invention

The present invention relates to a release agent for use on a releasing sheet of an adhesive product, such as an adhesive tape, an adhesive sheet or an adhesive fastening product, for use in a variety of fields exemplified by the medical, office, construction, painting and packaging fields.

2. Discussion of the Background

A releasing sheet, which is endowed with releasability by applying a variety of release agents to the surface of a paper or plastic film base member, has been called a "releasing paper" or a "separator" and has been widely used in adhesive products. The releasing characteristic is mainly provided by a process comprising the steps of applying an organic solvent solution containing a release silicone to the surface of a base, and either drying the solution, heat curing it or adding a hardening agent to a crosslink silicone resin in order to fix it to the surface of the base.

Recently, due to the desire for a water-based emulsion or a solventless releasing silicone in order to overcome the problems of air pollution, fire hazards, maintaining worker sanitation and energy conservation, the quantity of this type of silicone being used increases year by year. However, in the case of the solventless silicone release agent, the crosslinking density must be raised because in order to minimize viscosity the molecular weight of the silicone is extremely small. Moreover, from an equipment standpoint there are difficulties in obtaining thin and uniform coatings, and accordingly there are problems with coating precision.

On the other hand, silicone emulsion type release agents are very widely used particulary in Europe and America. However, they suffer from a multiplicity of disadvantages such as the undesirable penetration of the paper surface due to inferior film forming characteristics thereof. Therefore, various improvements are necessary in order to achieve satisfactory characteristics and in order to reduce costs.

As the separators must have a wide range of peel force from small to large to adapt to various applications, the peel resistance value of pure silicone contained in the conventional release agent in which the tapes must be stacked at the time of application, is too small even if the separator is applied in a very small quantity. In order to adequately control the peel resistance value, a heavy release-controlling agent comprising units of $SiO_2$ and $(CH_3) SiO_{1/2}$, or units of $CH_2=CH(CH_3)_2 SiO_{1/2}$ is used to adjust the value. However, there arises a problem in that the stability of the peel force becomes poor, and in that the agent is shifted to the surface of the adhesive agent, causing the adhesive force and tack to deteriorate.

An object of the present invention is to provide a release agent for a separator for use in an adhesive product, and more particularly to provide a release agent capable of keeping the working space clean at the time of manufacturing the separator and overcoming air pollution occurring due to volatilization and dispersion into the air.

Moreover, another object of the present invention is to provide a release agent capable of overcoming the difficulty in controlling the peel resistance value, deterioration of the stability of the peel force caused by the peel force controlling agent and deterioration of the adhesive force occurring due to the shift to the adhesive layer, which are problems encountered with the conventional pure silicone resin release agent.

Furthermore, another object of the present invention is to provide a low-cost release agent with which a recyclable releasing sheet can be manufactured without necessitating a polyethylene laminating process, a barrier coat using polyvinyl alcohol or the like to fill up the surface as required in the case of the conventional organic solvent type silicone release agent.

SUMMARY OF THE INVENTION

According to the present invention, there is provided a silicone copolymer emulsion comprising:

(A) 10 to 90 wt % of a silicone component containing
 (i) 5 to 60 wt % of compound (a) and
 (ii) 95 to 40 total wt % of compound (b) and compound (c);

(B) 90 to 10 wt % of a copolymerizable monomer; and (C) a platinum compound or an organic tin compound as a catalyst, said compound (a) (hereinafter referred to as "silicone macromonomer") being expressed by the following formula (1)

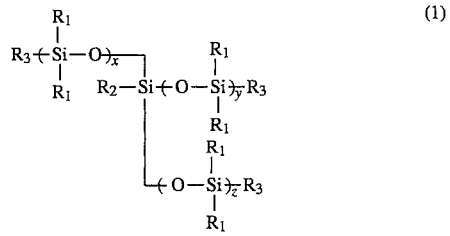

wherein $R_1$ denotes $-C_mH_{2m+1}$, $-Ph$, $-C_mH_{2m}-O\underset{\underset{O}{\|}}{C}-\underset{\underset{CH_3}{|}}{C}=CH_2$ or $-C_mH_{2m}-\underset{\underset{OC_mH_{2m+1}}{|}}{C}=CH_2$ , Ph denotes a phenyl group or an alkyl substituted phenyl group,

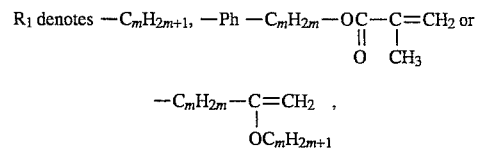

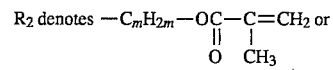

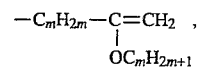

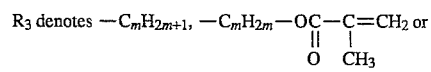

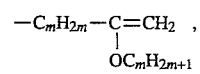

m denotes 0 to 10; x: 0 to 150; y: 0 to 150; and, z: 0 to 150, and, x+y+z=5 to 150 said compound (b) (hereinafter referred to as "silicone (2)") being expressed by the following formula (2)

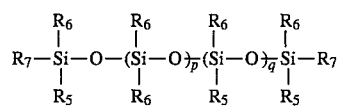

(2)

wherein $R_5$ denotes —H or —OCH$_3$;

$R_6$: —C$_m$H$_{2m+1}$;

$R_7$: —H, —OCH$_3$ or —C$_m$H$_{2m+1}$;

where m denotes 1 to 10;

p: 0 to 560;

q: 0 to 560; and, p+q=10 to 560 said compound (c) (hereinafter referred to as "silicone (3)") being expressed by the following formula (3)

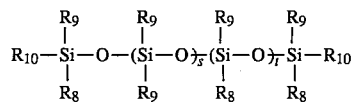

(3)

where $R_8$ denotes —C$_{m-1}$H$_{2(m-1)}$—CH=CH$_2$ or —OH;

$R_9$: —C$_m$H$_{2m+1}$;

$R_{10}$: —C$_{m-1}$H$_{2(m-1)}$—CH=CH$_2$, —OH or —C$_m$H$_{2m+1}$;

where m denotes 1 to 10 s: 0 to 560;

t: 0 to 560; and, s+t=10 to 560.

Further, according to the present invention, there is provided a method of manufacturing a silicone copolymer emulsion (III) comprising the steps of:

emulsifying and dispersing to a particle size of a diameter of 0.5 μm or less a monomer composition composed of (A) 10 to 90 wt % of a silicone component containing (i) 5 to 60 wt % of the silicone macromonomer and (ii) 95 to 40 wt % of silicone (2), and (B) 90 to 10 wt % of a copolymerizable monomer;

raising the temperature to copolymerize said emulsified and dispersed monomer composition to obtain a silicone copolymer emulsion (I);

emulsifying and dispersing to a particle size of a diameter of 0.5 μm or less a monomer composition composed of (C) 10 to 90 wt % of a silicone component containing (i) 5 to 60 wt % of the silicone macromonomer and (ii) 95 to 40 wt % of silicone (3), and (D) 90 to 10 wt % of a copolymerizable monomer;

raising the temperature to copolymerize said emulsified and dispersed monomer composition to obtain a silicone copolymer emulsion (II); and blending said silicone copolymer emulsions (I) and (II) to obtain a silicone copolymer emulsion (III), said silicone copolymer emulsion (III) containing a platinum compound or an organic tin compound as a catalyst.

Still further, according to the present invention, there is provided a method of manufacturing a silicone copolymer emulsion comprising the steps of:

emulsifying and dispersing to a particle size of a diameter of 0.5 μm or less a monomer composition composed of 5 to 60 wt % of the silicone macromonomer and 95 to 40 wt % copolymerizable monomer;

raising the temperature of said emulsified and dispersed monomer composition to obtain a silicone copolymer emulsion (I);

adding the silicone (2) and the silicone (3), which have been previously emulsified and dispersed, to said silicone copolymer emulsion (I) so as to blend them to make the total content ration of the silicone component 10 to 90 wt % to obtain a silicone copolymer emulsion (III), said silicone copolymer emulsion (III) containing a platinum compound or an organic tin compound as a catalyst.

Yet further, according to the present invention, there is provided an emulsion-type release agent containing said silicone copolymer emulsion. As a result of the foregoing development, the above problems can be overcome.

The silicone macromonomer is expressed by the above formula (1) having the relationship x+y+z=5 to 150 in which generally x=z=0, y=13 to 131, $R_1$=—CH$_3$, and $R_2$ and/or $R_3$ usually has a substituent —C$_3$H$_6$OCOC(CH$_3$)=CH$_2$.

The compounds, that is, silicone (2) and silicone (3), have the function of crosslinking silicone copolymers by forming siloxane bonds or carbon-silicon bonds by using the catalyzing effect of a platinum compound or an organic tin compound when emulsion polymerization is carried out or after they have been applied to the base as release agents. The type of crosslinking may be selected from a group consisting of heat crosslinking, ultraviolet-ray crosslinking and electron ray crosslinking. The crosslinking may be in the form of an additional reaction type or a condensation reaction type. The molecular weight of the compounds is p+q=s+t=10 to 560 in formulas (2) and (3).

Generally, in formula (2), q=5 to 100, p+q=10 to 524, $R_5$ and $R_7$ are —H or —OCH$_3$ and $R_6$ is CH$_3$.

In formula (3), t=0 to 50, s+t=10 to 524, and $R_8$ and $R_{10}$ are —CH=CH$_2$, with those causing the following crosslinking to occur under the presence of a platinum catalyst being normally employed.

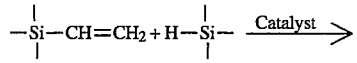

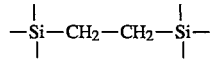

The copolymerizable monomer that can be copolymerized with the silicone macromonomer may be selected from a neutral monomer group, for example, vinyl esters such as ester acrylate, styrene, vinyl acetate, vinyl propionate or vinyl versenate; ethylene; butadiene; isoprene; vinyl chloride; and vinylidene chloride. Moreover, it may be selected from an acid compound group, for example, acrylic acid, methacrylic acid, itaconic acid, maleic acid, fumaric acid, vinyl sulfonate, and phosphate ester of hydroxy ethyl acrylate or methacrylate. In addition, vinyl pyridine, vinyl imidazole, dimethyl aminoethyl methacrylate, hydroxymethyl acrylate, hydroxyethyl methacrylate, acrylonitrile, methacrylonitrile, and their quaternary compounds may be used. In a word, all unsaturated compounds that directly or indirectly copolymerize with the silicone macromonomer may be employed.

The catalyst for polymerization may be any radical polymerization initiator such as an azo compound e.g. azobisisobutyronitrile or a peroxide e.g. benzoilperoxide regardless of the fact that it is oil soluble or water soluble. When the former catalyst is employed, it is convenient if it is dissolved in a mixed solution of a silicone component and a copolymerizable monomer that can be copolymerized with the silicone component.

The platinum compounds for use as a catalyst for crosslinking silicone are exemplified by platinum, PtX$_2$, PtX$_4$ (X=halogen), PtO.nH$_2$O, PtO$_2$.nH$_2$O, Pt(SO$_4$)$_2$ and $PtP_2O_7$.

The organic tin compounds are exemplified by tin, $R_4Sn$, $R_3SnX$, $R_2SnX_2$, $RSnX_3$, $R_3SnOR$, $R_3SnOH$ and $R_2SnO$ (R=an alkyl group or an aryl group).

The foregoing catalysts are used in such a manner that the platinum compound is employed in a case where $R_5$ and $R_7$ of silicone (2) are —H systems and $R_8$ and $R_{10}$ of silicone (3) are —$C_{m-1}H_{2(m-1)}$—CH=$CH_2$ systems. The organic tin compound catalyst is employed in a case where $R_5$ and $R_7$ of silicone (2) are —$OCH_3$ systems and $R_8$ and $R_{10}$ of silicone (3) are —OH systems.

If the content of the silicone component of the silicone macromonomer, silicone (2) and silicone (3) is smaller than 10 wt % in the foregoing case, the peel resistance cannot be satisfactorily weakened, resulting in the base member being frequently broken. If the content is larger than 90 wt %, the peel force cannot be easily adjusted. Moreover, the film forming ability is inferior, causing the silicone to penetrate into the paper. Therefore, the effect of also serving as a barrier coat in the coating process cannot be obtained and the cost cannot be reduced.

The silicone macromonomer copolymerizes with the copolymerizable monomer so that it serves as a compatibilizer for silicone (2) and silicone (3). On the other hand, silicone (2) and silicone (3) are required to obtain a light releasing ability. The proportion of the silicone macromonomer in the entire silicone component must range from 5 to 60 wt %. If the ratio of the silicone macromonomer is lower than 5 wt %, it cannot serve as a satisfactory compatibilizer, causing insufficient stability in the emulsion. What is worse, the release agent obtained from the copolymer causes the silicone (2) and silicone (3) in the upper layer to easily peel after it has been applied to the base. As a result, the effects required for the release agent cannot be obtained. If the ratio of the silicone macromonomer is larger than 60 wt %, the copolymerization of the silicone macromonomer with the macromonomer cannot easily proceed. Therefore, a considerably large non-reacted portion remains, causing transference of the silicone component to the adhesive layer to take place. As a result, the adhesivity of the adhesive tape or the like will deteriorate. Moreover, the limitation of the total content of the silicone component inevitable due to the performance decreases the addition ratio addition of silicone (2) and silicone (3), and therefore sufficient release characteristics cannot be obtained.

The ratio of blending silicone (2) and silicone (3) and the quantity of the added catalyst comprising the platinum compound or the organic tin compound vary depending upon the type and the number of functional groups in the silicone. Therefore, as long as the necessary crosslinking can be performed a catalyst comprising the platinum compound or the organic tin compound similar to an ordinary release agent can be used. The quantity of the added catalyst is usually 0.1 to 5.0 wt % with respect to the total quantity of silicone (2) and silicone (3).

It is preferable that the molar ratio of the functional group for forming the siloxane bond or the carbon-silicon bond in silicone (2) and silicone (3) be ½ to ⅔. It may be used in such a manner that it is emulsified with and allowed to react to the silicone macromonomer or the copolymerizable monomer. As an alternative to this, a method may be employed in which only the silicone macromonomer and the copolymerizable monomer are subjected to the emulsification reaction, and then silicone (2) and silicone (3), which have been individually emulsified, are added.

Before polymerization, the emulsion which has silicone components [silicone macromonomer solely or silicone macromonomer, silicone 2 and silicone 3] and a copolymerizable monomer must have a particle size of 0.5 μm or less. If it is larger than 0.5 μm, there is an extremely undesirable tendency in which a great quantity of polymerized substances containing a large quantity of the silicone components are generated causing the polymerized substances to form into coarse particles, that is, clots.

The emulsion composed of the mixture of the silicone component and the copolymerizable monomer and having the particle size of 0.5 μm or less may be manufactured by emulsifying the mixture and an aqueous solution of an emulsifier in a heavy duty emulsifying apparatus.

In order to make the particle the predetermined size of 0.5 μm or less, the emulsifier, the heavy duty emulsifying apparatus, and the emulsifying conditions must be suitably selected. If inappropriate selections are made, the particle size of 0.5 μm or less cannot be realized and phase separation will take place over time even if an irregular emulsion was temporarily formed.

As the emulsifier, any emulsifier that is used in normal emulsifying polymerization may be employed. Further, higher alcohols, such as lauryl alcohol, are considered feasible as a sub-emulsifier. In particular, a so-called reactive emulsifier having a radical polymerizable unsaturated bond may preferably be employed because of its effectiveness.

The heavy duty emulsifying machine may be one comprising a rotor and a stator, one comprising a high-speed rotary portion, an ultrasonic type or one adapted for passing components through apertures under high pressure. The last apparatus is convenient because of its wide range of applicability.

The polymerization reaction is performed by raising, to a predetermined level, the temperature of the thus-obtained emulsion of the silicone component and a copolymerizable monomer that can be polymerized with the silicone component. In order to easily control the reaction temperature, a portion of the emulsion is usually injected into the polymerization reactor and the balance is added as occasion demands. If a system in which moderate reactions are performed is used, the entire quantity may be injected into the polymerization reactor.

The thus-obtained copolymerizable emulsion type release agent is applied to a base such as paper, cloth or film before the base is heated and dried so that a separator in the form of release paper or a release sheet is obtained. Although the thickness of the applied agent varies depending upon the material of the base, the qualities and quantity of the adhesive agent to be positioned at the surface, and the content of silicone in the copolymer, it is sufficient that the average thickness be 0.5 g/m² or more.

It can be considered that the silicone copolymer emulsion according to the present invention has releasability due to the fact that the silicone copolymer emulsion applied to and dried on the paper, cloth or the film base, etc. causes the polydimethyl siloxane chains formed by the crosslinking silicone component to form a film adjacent to the air with the film ultimately covering the base. It is estimated that the silicone macromonomer is contained as a portion of the copolymer due to radical polymerization with ethylene type acryl component so that it serves as a compatibilizer.

The release agent containing the silicone copolymer emulsion according to the present invention has a peel resistance that can be finely controlled by varying the quantity for use of the silicone component in the emulsion. The reason for this is that the peel resistance is changed gradually with respect to the added quantity (that is, the quantity of added silicone) as compared with a conventional silicone release agent. It is arranged in such a manner that the silicone macromonomer and the copolymerizable monomer in the emulsion, particularly, the acryl type monomer, are copolymerized causing the generation of a film forming ability, and therefore the permeation into the base can be prevented. Therefore, the necessity of previously applying a polyethylene laminating material or an undercoating material to the conventional base can be eliminated, resulting in the omission of the application process.

EXAMPLES

The present invention will be illustrated with reference to the following Examples.

Example 1

A mixture of 20 parts by weight of silicone macromonomer (A) [$x=z=0$; $y=131$; $R_1$ and $R_3$: —$CH_3$; $R_2$: —$C_3H_6$—OCO—$C(CH_3)=CH_2$] serving as the silicone component, 4 parts by weight of methyl methacrylate (MMA) serving as the copolymerizable monomer; 30 parts by weight of 2-ethyl hexyl acrylate (2EHA); 40 parts by weight of styrene (St); 2 parts by weight of 2-hydroxyethyl methacrylate (2HEMA); 2 parts by weight of methacrylic acid (MAA); and 2 parts by weight of N-methylol methyl methacryl amide (N-MAM) was used, and 0.2 part by weight of azobis isobutyronitrile serving as the catalyst for the polymerization was added to and dissolved in the mixture. Then, water was added to the obtained solution, so that a 40 wt % aqueous solution of the monomer components was prepared. As the emulsifier, 0.8 wt % of anion and copolymerizable reactive emulsifier Adecalia Soap SE-10N (10 % aqueous solution manufactured by Asahi Denka Kogyo) was added to the foregoing mixed solution. Then, a high pressure homogenizer (MantonGolyn) was used to perform high speed emulsification, so that an emulsion having an average particle size of 0.26 μm was prepared. Next, the entire quantity was injected into a chamber to perform nitrogen substitution for 30 minutes. Then, under the conditions of a reaction temperature of 80°±1° C., a reaction period of four hours, and a maturation period of two hours polymerization reactions were carried out.

The characteristics of the obtained silicone copolymer emulsion were as follows:

| | |
|---|---|
| Concentration of solid component | 40.1 wt % |
| Average particle size | 0.15 μm |
| pH | 3.1 |
| Viscosity (30° C.) | 50 |
| MFT (Minimum Film Formation Temperature) | 30° C. |

Next, 0.5 part by weight of emulsion of silicone (C) ($q=10$; $p+q=393$; $R_5$ and $R_7$: —H, and $R_6$: $CH_3$) serving as silicone (2) and 0.5 part by weight of emulsion of silicone (D) ($t=4$; $s+t=262$; $R_8$ and $R_{10}$: —$CH=CH_2$; and $R_9$: $CH_3$) serving as silicone (3) were added to 2 parts by weight of the above silicone copolymer emulsion. It should be noted that 0.2 part by weight of platinum was contained as the catalyst in both silicone (C) and (D), respectively.

The characteristics of the obtained emulsion were as follows:

| | |
|---|---|
| Concentration of solid component | 40.0 wt % |
| Average particle size | 0.12 μm |
| pH | 5.2 |
| Viscosity (30° C.) | 500 |
| MFT | 30° C. |

Example 2

A mixture was used which consisted of a silicone component composed of 13.4 parts by weight of silicone macromonomer (A) and 33.3 parts by weight of silicone (C) and a copolymerizable monomer composed of 2.7 parts by weight of methyl methacrylate, 20 parts by weight of 2-ethyl hexyl acrylate, 26.7 parts by weight of styrene, 1.3 parts by weight of 2-hydroxy ethyl methacrylate, 1.3 parts by weight of methacrylic acid, and 1.3 parts by weight of N-methylol methyl methacryl amide. The mixture was emulsified and polymerized under the same conditions as those employed in Example 1, so that silicone copolymer emulsion A was obtained.

Under the same conditions, silicone (D) was used in place of silicone (C), so that silicone copolymer emulsion B was obtained.

The thus-obtained silicone copolymer emulsions A and B were blended at a ratio of 1/1 so that the following silicone copolymer emulsion was obtained.

| | |
|---|---|
| Concentration of solid component | 40.1 wt % |
| Average particle size | 0.15 μm |
| pH | 5.0 |
| Viscosity (30° C.) | 400 |
| MFT | 30° C. |

Examples 3 to 7

The manufacturing method according to Example 1 or Example 2 was changed as shown in Tables 1 and 2 to reflect the type and the quantity of the silicone components used and the quantity of the copolymerizable monomer that can be copolymerized with the silicone macromonomer used in examples 3 to 7. As a result, silicone copolymer emulsions were manufactured. The obtained results are shown in Tables 1 to 4.

The silicone macromonomer (B) used had the characteristics that $x=z=0$; $y=13$; $R_1$: —$CH_3$ and, $R_2$ and $R_3$: —$C_3H_6OCOC(CH_3)=CH_2$. Silicon (E) serving as silicone (2) had the characteristics that $q=10$; $p+q=393$; $R_5$ and $R_7$: —$OCH_3$; and, $R_6$: $CH_3$. Silicon (F) serving as silicone (3) had the characteristics that $t=6$; $s+t=524$; $R_8$ and $R_{10}$: —OH; and, $R_9$: —$CH_3$. It should be noted that 2 wt % of a solid component of $(CH_3CH_2)_2SnCl_2$ was, as the catalyst, added to both silicone components (E+F).

In Example 3, silicone (B) was used in place of silicone (A) according to Example 1. Example 4 was arranged in such a manner that silicone (A), silicone (C) and silicone (D) according to Example 2 were changed to silicone (B), silicone (E) and silicone (F), respectively.

In Example 5, the composition of the silicone component according to Example 2 was changed. Example 6 was arranged in such a manner that silicone (2) and silicone (3) were a divided and then added both before and after the emulsifying polymerization. Example 7 was arranged in such a manner that the ratio of blending the copolymerizable monomer was changed.

Comparative Example 1

A conventional release sheet using the organic solvent release agent was tested as is.

Comparative Example 2

An emulsion type pure silicone release agent found on the market was used.

Comparative Examples 3 to 9

The type and quantity of use silicone macromonomer and the silicone used and the quantity of the copolymerizable monomer used according to Example 1 were changed to those shown in Tables 3 and 4. However, Comparative Example 9 employed a homo mixer in place of the high pressure homogenizer (MantonGolyn), and the particle size of the emulsion containing the silicone component was made to be 1 μm or more.

Example 8

High quality Zerox paper (60 g/m$^2$) was applied with the silicone copolymer emulsions according to Examples 1 to 7 and Comparative Examples 3 to 9 and the release agent according to Comparative Example 2 by using a 2 mil applicator, and then the applied liquid was dried at 150° C. for one minute. Next, an emulsion type adhesive SE-6100 (manufactured by Showa High Polymer Co. Ltd.) was applied to the paper by using a 2 mil applicator, and then the applied liquid was dried at 110° C. for one minute. Immediately, another high quality Zerox paper was brought into contact with it to obtain the test samples.

The foregoing samples were subjected to processes for measuring the T-peel strength (tensile speed was 300 mm/min) and the residual adhesion ratio. The results are shown in the lowest portion of Tables 1 to 4.

An impact test was performed in conformity with JIS P-8209. The results are shown in Table 5.

TABLE 1

| | Example 1 | Example 2 | Example 3 | Example 4 |
|---|---|---|---|---|
| Emulsion | | | | |
| Type of silicone macromonomer | A | A | B | B |
| Quantity added (parts by weight) | 20 | 13.4 | 20 | 13.4 |
| Type of cross-linking silicone | — | C  D | — | E  F |
| Quantity added (parts by weight) | — | 33.3  33.3 | — | 33.3  33.3 |
| Copolymerizable Monomer | | | | |
| MMA | 4 | 2.7 | 4 | 2.7 |
| 2EHA | 30 | 20 | 30 | 20 |
| St | 40 | 26.7 | 40 | 26.7 |
| 2HEMA | 2 | 1.3 | 2 | 1.3 |
| MAA | 2 | 1.3 | 2 | 1.3 |
| N-MAM | 2 | 1.3 | 2 | 1.3 |
| Particle size of emulsion (μm) | 0.26 | 0.24 | 0.23 | 0.23 |
| Emulsion crosslinking silicone (40 wt %) | C + D | — | C + D | — |
| Quantity added *(1) | 1/2 | — | 1/2 | — |

TABLE 1-continued

| | Example 1 | Example 2 | Example 3 | Example 4 |
|---|---|---|---|---|
| Product | | | | |
| Concentration of Solid Component (wt %) | 40 | 40.1 | 40.0 | 40.0 |
| Average particle size (μm) | 0.12 | 0.15 | 0.13 | 0.16 |
| pH | 5.2 | 5.4 | 5.5 | 5.5 |
| Viscosity (cps/30° C., BH type, 60 rpm) | 500 | 300 | 300 | 200 |
| Quantity of non-reacted silicone macromonomer *(2) | <5 | <5 | <5 | <5 |
| Content of silicone (wt %) | 46.7 | 46.7 | 46.7 | 46.7 |
| MFT (°C.) | 30 | 30 | 30 | 30 |
| Example 8 | | | | |
| Compatibility | ○ | ○ | ○ | ○ |
| Surface covering effect | ○ | ○ | ○ | ○ |
| T peel strength (g/24 mm) | <10 | <10 | <10 | <10 |
| Residual Bonding Ratio (%) | >90 | >90 | >90 | >90 |

*(1) upper portion: total weight of crosslinking silicon; lower portion: weight of silicone copolymer emulsion
(2) total quantity with respect to silicone macromonomer (%)

TABLE 2

| | Example 5 | Example 6 | Example 7 |
|---|---|---|---|
| Emulsion | | | |
| Type of silicone macromonomer | A | A | A |
| Quantity added (parts by weight) | 33.3 | 16 | 13.4 |
| Type of crosslinking silicone | C  D | C  D | C  D |
| Quantity added (parts by weight) | 13.4  13.4 | 20  20 | 33.3  33.3 |
| Copolymerizable Monomer | | | |
| MMA | | 2.7 | 3.2 | 9.3 |
| 2EHA | 20 | 24 | 13.3 |
| St | 26.7 | 32 | 26.8 |
| 2HEMA | 1.3 | 1.6 | 1.3 |
| MAA | 1.3 | 1.6 | 1.3 |
| N-MAM | 1.3 | 1.6 | 1.3 |
| Particle size of emulsion (μm) | 0.25 | 0.26 | 0.23 |
| Emulsion crosslinking silicone (40 wt %) | — | C + D | — |
| Quantity added *(1) | — | 1/5 | — |
| Product | | | |
| Concentration of Solid Component (wt %) | 39.9 | 40.0 | 40.1 |
| Average particle size (μm) | 0.16 | 0.14 | 0.15 |
| pH | 5.7 | 5.4 | 5.5 |
| Viscosity (cps/30° C., BH type, 60 rpm) | 250 | 300 | 300 |
| Quantity of non-reacted silicone macromonomer *(2) | <5 | <5 | <5 |

TABLE 2-continued

|  | Example 5 | Example 6 | Example 7 |
|---|---|---|---|
| Content of silicone (wt %) | 46.7 | 46.7 | 46.7 |
| MFT (°C.) | 30 | 30 | 55 |
| Example 8 |  |  |  |
| Compatibility | o | o | o |
| Surface covering effect | o | o | o |
| T peel strength (g/24 mm) | 40 | <10 | <10 |
| Residual Bonding Ratio (%) | >90 | >90 | >90 |

*(1) upper portion: total weight of crosslinking silicone; lower portion: weight of silicone copolymer emulsion
(2) total quantity with respect to silicone macromonomer (%)

TABLE 3

|  | C.E. 1 | C.E. 2 | C.E. 3 | C.E. 4 | C.E. 5 |
|---|---|---|---|---|---|
| Emulsion |  |  |  |  |  |
| Type of silicon macromonomer | — | — | A | A | A |
| Quantity added (parts by weight) | — | — | 2.3 | 37.4 | 41.4 |
| Type of crosslinking silicone | — | — | C D | E F | — |
| Quantity added (parts by weight) | — | — | 44.4 44.4 | 9.3 9.3 | — |
| Copolymerizable Monomer |  |  |  |  |  |
| MMA | — | — | 2.7 | 2.7 | 3.0 |
| 2EHA | — | — | 20 | 20 | 22 |
| St | — | — | 26.7 | 26.8 | 29.4 |
| 2HEMA | — | — | 1.3 | 1.3 | 1.4 |
| MAA | — | — | 1.3 | 1.3 | 1.4 |
| N-MAM | — | — | 1.3 | 1.3 | 1.4 |
| Particle size of emulsion (μm) | — | — | 0.20 | 0.16 | 0.19 |
| Emulsion crosslinking silicone (40 wt %) | — | — | — | — | C + D |
| Quantity added*(1) | — | — | — | — | 1/10 |
| Product |  |  |  |  |  |
| Concentration of Solid Component (wt %) | — | — | 40.0 | 40.1 | 39.9 |
| Average particle size (μm) | — | — | 0.18 | 0.15 | 0.18 |
| pH | — | — | 5.2 | 5.5 | 5.4 |
| Viscosity (cps/30° C., BH type, 60 rpm) | — | — | 300 | 200 | 300 |
| Quantity of non-reacted silicone macromonomer*(2) | — | — | <5 | <5 | >50 |
| Content of silicon (wt %) | — | — | 46.7 | 46.7 | 46.7 |
| MFT (°C.) | — | — | 30 | 30 | 30 |
| Example 8 |  |  |  |  |  |
| Compatibility | — | — | o | o | o |
| Surface covering effect | — | — | o | o | x |
| T peel strength (g/24 mm) | — | — | <10 | 10–100 | 10–100 |
| Residual Bonding Ratio (%) | — | — | 70 | 10 | 10 |

Note) C.E means Comparative Example
*(1) upper portion: total weight of crosslinking silicone; lower portion: weight of silicone copolymer emulsion
(2) total quantity with respect to silicone macromonomer (%)

TABLE 4

|  | C.E. 6 | C.E. 7 | C.E. 8 | C.E. 9 |
|---|---|---|---|---|
| Emulsion |  |  |  |  |
| Type of silicone macromonomer | A | A | A | A |
| Quantity added (parts by weight) | 2.9 | 27.1 | 20 | 13.4 |
| Type of crosslinking silicone | C D | C D | — | C D |
| Quantity added (parts by weight) | 7.0 7.0 | 63.0 63.0 | — | 33.3 33.3 |
| Copolymerizable Monomer |  |  |  |  |
| MMA | 4.6 | 0.4 | 4 | 2.7 |
| 2EHA | 33.8 | 3.75 | 30 | 20 |
| St | 45.1 | 5.0 | 40 | 26.7 |
| 2HEMA | 2.2 | 0.25 | 2 | 1.3 |
| MAA | 2.2 | 0.25 | 2 | 1.3 |
| N-MAM | 2.2 | 0.25 | 2 | 1.3 |
| Particle size of emulsion (μm) | 0.18 | 0.26 | 0.25 | 1.5 |
| Emulsion crosslinking silicone (40 wt %) | — | — | E + F | — |
| Quantity added*(1) | — | — | 9/1 | — |
| Product |  |  |  |  |
| Concentration of Solid Component (wt %) | 40.0 | 40.0 | 40.0 | 20.5 |
| Average particle size (μm) | 0.16 | 0.18 | 0.12 | 0.16 |
| pH | 6.0 | 6.4 | 5.2 | 5.4 |
| Viscosity (cps/30° C., BH type, 60 rpm) | 200 | <100 | 80 | <100 |
| Quantity of non-reacted silicone macromonomer*(2) | <5 | >50 | <5 | <5 |
| Content of silicone (wt %) | 9.9 | 90.1 | 92 | 46.7 |
| MFT (°C.) | 30 | 0 | 0 | 30 |
| Example 8 |  |  |  |  |
| Compatibility | o | o | o | o |
| Surface covering effect | o | x | x | x |
| T peel strength (g/24 mm) | Broken | <10 | <10 | Broken |
| Residual Bonding Ratio (%) | — | 70 | 90 | — |

Note) C.E means Comparative Example
*(1) upper portion: total weight of crosslinking silicone; lower portion: weight of silicone copolymer emulsion
(2) total quantity with respect to silicone macromonomer (%)

TABLE 5

|  | Recyclability |
|---|---|
| Example 1 | OK (disaggregated in the pipe, and resin debris was removable by a screen) |
| 2 | OK (disaggregated in the pipe, and resin debris was removable by a screen) |
| 3 | OK (disaggregated in the pipe, and resin debris was removable by a screen) |
| 4 | OK (disaggregated in the pipe, and resin debris was removable by a screen) |
| 5 | OK (disaggregated in the pipe, and resin debris was removable by a screen) |
| 6 | OK (disaggregated in the pipe, and resin debris was removable by a screen) |
| 7 | OK (disaggregated in the pipe, and resin debris was removable by a screen) |
| Comparative Example 1 | x (although disaggregated in the pipe, clogging of film-like resin took place while |

TABLE 5-continued

| | Recyclability |
|---|---|
| | flowing) |
| Comparative Example 2 | Δ (removal of the resin by using a screen was impossible, and the strength of the recycled paper deteriorated) |
| Comparative Example 3 | OK (same as Examples) |
| Comparative Example 4 | OK (same as Examples) |
| Comparative Example 5 | OK (same as Examples) |
| Comparative Example 6 | OK (same as Examples) |
| Comparative Example 7 | Δ (same as Comparative Example 2) |
| Comparative Example 8 | Δ (same as Comparative Example 2) |
| Comparative Example 9 | OK (same as Examples) |

According to the present invention, there is provided a silicone copolymer emulsion in the form of a copolymer comprising a silicone macromonomer, silicone (2), silicone (3) and a copolymerizable monomer, the silicone copolymer emulsion containing, as a catalyst, a platinum compound or an organic tin compound. When the emulsion is used as the release agent of the separator of an adhesive product, it was confirmed that the release agent enables a releasing effect similar or superior to that obtainable when using a conventional organic solvent type release agent. In particular, the conventional organic solvent type release agent technically cannot react sufficiently when intermediate to large peel resistance is required. However, the silicone copolymer emulsion according to the present invention has the advantage that the releasability can be widely and easily controlled so that areas which were impossible to cover by the conventional technology can be covered.

The present invention does not require the polyethylene laminating process or the polyvinyl alcohol necessary for covering the surface and forming a barrier coating as is required by the conventional organic solvent type silicone resin release agent. Therefore, the processes can be omitted. Also, since no undercoat agent such as polyethylene laminate is used, a recyclable release sheet can be manufactured.

The present invention brings about effects which have been impossible for the conventional pure silicone release agent to possess by changing various factors, such as the type and the ratio of the added silicone, the content of the silicone component and the quantity of the emulsion to be used in coating. Since the release agent is water soluble, which is environment-friendly, is capable of saving energy and can contribute to conserving natural resources, significant effects can be obtained.

What is claimed is:

1. A silicone copolymer emulsion comprising:
   (A) 10 to 90 wt % based on (A) of a silicone component containing
     (i) 5 to 60 wt % based on (A) of compound (a) and
     (ii) 95 to 40 total wt % of compound (b) and compound (c);
   (B) 90 to 10 wt % of a copolymerizable monomer; and,
   (C) a platinum compound or an organic tin compound as a catalyst,
said compound (a) being expressed by the following formula (1):

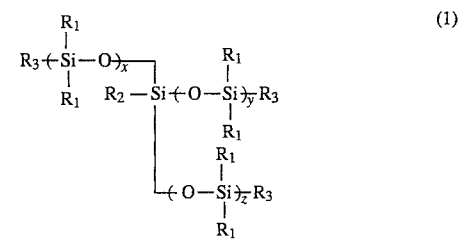

wherein $R_1$ denotes

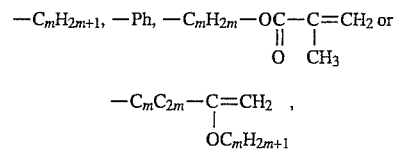

Ph denotes a phenyl group or an alkyl substituted phenyl group, $R_2$ denotes

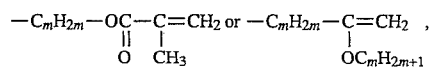

$R_3$ denotes

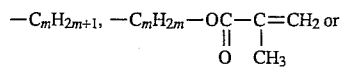

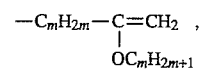

m denotes 0 to 10; x: 0 to 150; y: 0 to 150; and, z: 0 to 150, and, x+y+z=5 to 150 said compound (b) being expressed by the following formula (2)

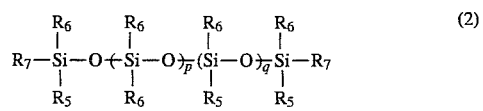

wherein $R_5$ denotes —H or —OCH$_3$;

$R_6$: —C$_m$H$_{2m+1}$;

$R_7$: —H, —OCH$_3$ or —C$_m$H$_{2m+1}$;

where m denotes 1 to 10;

p: 0 to 560;

q: 0 to 560; and, p+q=10 to 560 said compound (c) being expressed by the following formula (3)

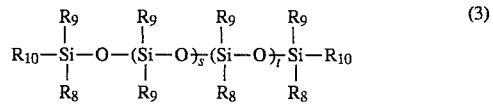

where $R_8$ denotes —C$_{m-1}$H$_{2(m-1)}$—CH=CH$_2$ or —OH;

$R_9$: —C$_m$H$_{2m+1}$;

$R_{10}$: —C$_{m-1}$H$_{2(m-1)}$—CH=CH$_2$, —OH or —C$_m$H$_{2m+1}$;

where m denotes 1 to 10 s: 0 to 560;

t: 0 to 560; and, s+t=10 to 560.

2. A method of manufacturing a silicone copolymer emulsion (III) comprising the steps of:

emulsifying and dispersing to a particle size of a diameter of 0.5 μm or less a monomer composition composed of (A) 10 to 90 wt % of a silicone component containing
   (i) 5 to 60 wt % based on (A) of compound (a) and
   (ii) 95 to 40 wt % based on (A) of compound (b), and (B) 90 to 10 wt % of a copolymerizable monomer;

raising the temperature to copolymerize said emulsified and dispersed monomer composition to obtain a silicone copolymer emulsion (I);

emulsifying and dispersing to a particle size of a diameter of 0.5 μm or less a monomer composition composed of (C) 10 to 90 wt % of a silicone component containing
   (i) 5 to 60 wt % based on (c) of compound (a) and
   (ii) 95 to 40 wt % based on (c) of silicone (c), and (D) 90 to 10 wt % of a copolymerizable monomer;

raising the temperature to copolymerize said emulsified and dispersed monomer composition to obtain a silicone copolymer emulsion (II); and blending said silicone copolymer emulsions (I) and (II) to obtain a silicone copolymer emulsion (III), said silicone copolymer emulsion (III) containing a platinum compound or an organic tin compound as a catalyst, said platinum compound or said organic tin compound being previously mixed with said compound (b) or said compound (c), or said platinum compound or said organic tin compound being added later to said silicone copolymer emulsion (I) or (II), said compound (a) being expressed by the following formula (1):

$$\begin{array}{c} R_1 \\ | \\ R_3\!-\!(Si\!-\!O)_{\overline{x}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\! \\ | \\ R_1 \end{array}$$ (1)

(Formula with $R_2$—Si—(O—Si)$_y$R$_3$ and (O—Si)$_z$R$_3$ branches bearing $R_1$ substituents)

wherein $R_1$ denotes $-C_mH_{2m+1}$, $-Ph$, $-C_mH_{2m}-OC(=O)-C(CH_3)=CH_2$ or $$-C_mH_{2m}-C(OC_mH_{2m+1})=CH_2,$$

Ph denotes a phenyl group or an alkyl substituted phenyl group, $R_2$ denotes $-C_mH_{2m}-OC(=O)-C(CH_3)=CH_2$ or $$-C_mH_{2m}-C(OC_mH_{2m+1})=CH_2,$$

$R_3$ denotes $-C_mH_{2m+1}$, $-C_mH_{2m}-OC(=O)-C(CH_3)=CH_2$ or $$-C_mH_{2m}-C(OC_mH_{2m+1})=CH_2,$$

m denotes 0 to 10; x: 0 to 150; y: 0 to 150; and, z: 0 to 150, and, x+y+z=5 to 150 said compound (b) being expressed by the following formula (2)

$$R_7-Si(R_6)(R_5)-O-(Si(R_6)(R_6)-O)_p-(Si(R_6)(R_5)-O)_q-Si(R_7)(R_5)-R_5 \quad (2)$$

wherein $R_5$ denotes $-H$ or $-OCH_3$;

$R_6$: $-C_mH_{2m+1}$;

$R_7$: $-H$, $-OCH_3$ or $-C_mH_{2m+1}$;

where m denotes 1 to 10;

p: 0 to 560;

q: 0 to 560; and, p+q=10 to 560 said compound (c) being expressed by the following formula (3)

$$R_{10}-Si(R_9)(R_8)-O-(Si(R_9)(R_8)-O)_s-(Si(R_9)(R_8)-O)_t-Si(R_{10})(R_8)-R_8 \quad (3)$$

where $R_8$ denotes $-C_{m-1}H_{2(m-1)}-CH=CH_2$ or $-OH$;

$R_9$: $-C_mH_{2m+1}$;

$R_{10}$: $-C_{m-1}H_{2(m-1)}-CH=CH_2$, $-OH$ or $-C_mH_{2m+1}$;

where m denotes 1 to 10 s: 0 to 560;

t: 0 to 560; and, s+t=10 to 560.

3. A method of manufacturing a silicone copolymer emulsion comprising the steps of:

emulsifying and dispersing to a particle size of a diameter of 0.5 μm or less a monomer composition composed of 5 to 60 wt % of compound (a) and 95 to 40 wt % copolymerizable monomer;

raising the temperature of said emulsified and dispersed monomer composition to obtain a silicone copolymer emulsion (I);

adding compound (b) and compound (c), which have been previously emulsified and dispersed, to said silicone copolymer emulsion (I) so as to blend them to make the total content ratio of the silicone component in said copolymer emulsion (I) to be 10 to 90 wt % to obtain a silicone copolymer emulsion (III), said silicone copolymer emulsion (III) containing a platinum compound or an organic tin compound as a catalyst, said platinum compound or said organic tin compound being previously mixed with said compound (b) or said compound (c), or said platinum compound or said organic tin compound being added later to said silicone copolymer emulsion (I), said compound (a) being expressed by the following formula (1):

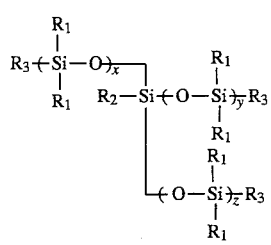

wherein $R_1$ denotes $-C_mH_{2m+1}$, $-Ph$, $-C_mH_{2m}-O-\underset{\underset{O}{\|}}{C}-\underset{\underset{CH_3}{|}}{C}=CH_2$ or $-C_mH_{2m}-\underset{\underset{OC_mH_{2m+1}}{|}}{C}=CH_2$, Ph denotes a phenyl group or an alkyl substituted phenyl group, $R_2$ denotes $-C_mH_{2m}-O-\underset{\underset{O}{\|}}{C}-\underset{\underset{CH_3}{|}}{C}=CH_2$ or $-C_mH_{2m}-\underset{\underset{OC_mH_{2m+1}}{|}}{C}=CH_2$, $R_3$ denotes $-C_mH_{2m+1}$, $-C_mH_{2m}-O-\underset{\underset{O}{\|}}{C}-\underset{\underset{CH_3}{|}}{C}=CH_2$ or $-C_mH_{2m}-\underset{\underset{OC_mH_{2m+1}}{|}}{C}=CH_2$, m denotes 0 to 10; x: 0 to 150; y: 0 to 150; and, z: 0 to 150, and, x+y+z=5 to 150 said compound (b) being expressed by the following formula (2)

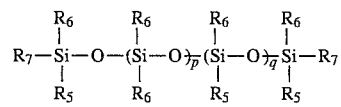

wherein $R_5$ denotes $-H$ or $-OCH_3$;

$R_6$: $-C_mH_{2m+1}$;

$R_7$: $-H$, $-OCH_3$ or $-C_mH_{2m+1}$;

where m denotes 1 to 10;

p: 0 to 560;

q: 0 to 560; and, p+q: 10 to 560 said compound (c) being expressed by the following formula (3)

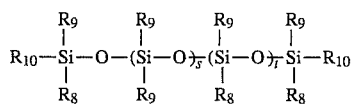

where $R_8$ denotes $-C_{m-1}H_{2(m-1)}-CH=CH_2$ or $-OH$;

$R_9$: $-C_mH_{2m+1}$;

$R_{10}$: $-C_{m-1}H_{2(m-1)}-CH=CH_2$, $-OH$ or $-C_mH_{2m+1}$;

where m denotes 1 to 10 s: 0 to 560;

t: 0 to 560; and, s+t=10 to 560.

4. An emulsion release agent containing said silicone copolymer emulsion according to claim 1.

* * * * *